US012782990B2

(12) United States Patent
Balsom et al.

(10) Patent No.: US 12,782,990 B2
(45) Date of Patent: Nov. 3, 2026

(54) CURRENT-MONITOR CIRCUIT FOR VOLTAGE REGULATOR IN SYSTEM-ON-CHIP

(71) Applicant: Qorvo US, Inc., Greensboro, NC (US)

(72) Inventors: Toby Balsom, Utrecht (NL); Jeroen Cornelis Kuenen, Beuningen (NL); Vikram Chaturvedi, Utrecht (NL)

(73) Assignee: Qorvo US, Inc., Greensboro, NC (US)

( * ) Notice: Subject to any disclaimer, the term of this patent is extended or adjusted under 35 U.S.C. 154(b) by 62 days.

(21) Appl. No.: 18/927,360

(22) Filed: Oct. 25, 2024

(65) Prior Publication Data

US 2025/0044821 A1 Feb. 6, 2025

Related U.S. Application Data

(63) Continuation of application No. 17/672,361, filed on Feb. 15, 2022, now Pat. No. 12,158,768.

(Continued)

(51) Int. Cl.
*G05F 1/575* (2006.01)
*G05F 1/565* (2006.01)

(52) U.S. Cl.
CPC .............. *G05F 1/565* (2013.01); *G05F 1/575* (2013.01)

(58) Field of Classification Search
CPC .......... G05F 1/462; G05F 1/465; G05F 1/468; G05F 1/56; G05F 1/575; G05F 1/562;

(Continued)

(56) References Cited

U.S. PATENT DOCUMENTS 4,885,477 A 12/1989 Bird et al.
7,986,499 B2 7/2011 Wang et al.

(Continued)

FOREIGN PATENT DOCUMENTS

CN 1320300 A 10/2001
CN 104391243 A 3/2015

(Continued)

OTHER PUBLICATIONS

De Lima, J. et al., "A differential-Mode current sensor and its application to an LDO regulator," 2009 IEEE International Symposium on Circuits and Systems, May 24-27, 2009, IEEE, Taipei, Taiwan, IEEE, pp. 804-807.

(Continued)

*Primary Examiner* — Nusrat Quddus
(74) *Attorney, Agent, or Firm* — Withrow & Terranova, P.L.L.C.

(57) ABSTRACT

The present disclosure describes a system-on-chip (SoC) including a built-in self-test (BIST) block, a low-dropout (LDO) voltage regulator with a pass metal-oxide semiconductor field-effect transistor (MOSFET), and a current-monitor circuit with a sensing MOSFET, a tuning MOSFET, a sensing resistor, and a tuning resistor. Herein, both the pass MOSFET and the sensing MOSFET receive an input voltage, and a gate of the pass MOSFET is coupled to a gate of the sensing MOSFET. The sensing MOSFET, the tuning MOSFET, and the sensing resistor are connected in series between the input voltage and ground, and the tuning resistor is coupled between a gate of the tuning MOSFET and ground. The BIST block is configured to tune a current through the tuning resistor so as to adjust a voltage at a connection point of the sensing MOSFET and the tuning MOSFET.

15 Claims, 6 Drawing Sheets

Related U.S. Application Data

(60) Provisional application No. 63/289,321, filed on Dec. 14, 2021.

(58) Field of Classification Search
CPC .......... G05F 1/565; G05F 1/567; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 8,816,658 | B1 | 8/2014 | De Vita et al. | |
| 10,254,778 | B1 | 4/2019 | Sambucco et al. | |
| 12,158,768 | B2 | 12/2024 | Balsom et al. | |
| 2004/0227539 | A1 | 11/2004 | Thiery | |
| 2005/0190475 | A1 | 9/2005 | Poss | |
| 2006/0250153 | A1 | 11/2006 | Colbeck | |
| 2008/0088286 | A1 | 4/2008 | Cho et al. | |
| 2008/0265852 | A1 | 10/2008 | Imura | |
| 2010/0102845 | A1 | 4/2010 | Kadow et al. | |
| 2010/0123521 | A1 | 5/2010 | Bach | |
| 2010/0289475 | A1 | 11/2010 | Lipka | |
| 2012/0176112 | A1 | 7/2012 | Singh et al. | |
| 2014/0266105 | A1 | 9/2014 | Li et al. | |
| 2017/0090494 | A1 | 3/2017 | Cui et al. | |
| 2018/0284830 | A1 | 10/2018 | Yung et al. | |
| 2022/0350356 | A1 | 11/2022 | D'Souza et al. | |
| 2024/0111320 | A1* | 4/2024 | Haruyama | G05F 1/575 |
| 2024/0264619 | A1* | 8/2024 | Banerjee | G05F 1/575 |
| 2025/0053185 | A1* | 2/2025 | Sherigar | G05F 1/575 |
| 2025/0123646 | A1* | 4/2025 | Wei | G05F 1/595 |
| 2025/0130606 | A1* | 4/2025 | Chong | G05F 1/575 |

FOREIGN PATENT DOCUMENTS

| | | | |
|---|---|---|---|
| CN | 111446848 | A | 7/2020 |
| CN | 111580589 | A | 8/2020 |
| JP | 2006276990 | A | 10/2006 |

OTHER PUBLICATIONS

Schröter, P. et al., "EMI resisting LDO voltage regulator with integrated current monitor," 2013 9th International Workshop on Electromagnetic Compatibility of Integrated Circuits (EMC Compo), Dec. 15-18, 2013, Nara, Japan, IEEE, pp. 107-112.

Talele, B. et al., "32.5 A Scalable and PCB-Friendly Daisy-Chain Approach to Parallelize LDO Regulators with 2.613% Current-Sharing Accuracy Using Dynamic Element Matching for Integrated Current Sensing," 2020 IEEE International Solid- State Circuits Conference—(ISSCC), Feb. 16-20, 2020, San Francisco, CA, USA, IEEE, 3 pages.

Extended European Search Report for European Patent Application No. 22208102.8, mailed May 11, 2023, 12 pages.

Office Action for Taiwanese Patent Application No. 111147269, mailed Jun. 17, 2026, 8 pages.

* cited by examiner

CURRENT-MONITOR CIRCUIT FOR VOLTAGE REGULATOR IN SYSTEM-ON-CHIP

RELATED APPLICATIONS

This application is a continuation of U.S. patent application Ser. No. 17/672,361, filed Feb. 15, 2022, now U.S. Pat. No. 12,158,768, which claims the benefit of provisional patent application Ser. No. 63/289,321, filed Dec. 14, 2021, the disclosures of which are hereby incorporated herein by reference in their entireties.

FIELD OF THE DISCLOSURE

The technology of the disclosure relates to an improved current-monitor circuit that enables high-accuracy load-current measurements of a voltage regulator in a built-in self-test (BIST) block of a system-on-chip (SoC).

BACKGROUND

An important feature of a modern system-on-chip (SoC) is a built-in self-test (BIST). It refers to adding production test functionality onto the SoC itself and utilizing the computing power already available in that chip. Modern BIST functions include multiplexing many different test nodes, sensing voltage, and forcing current, which are used for measuring critical circuit operation, for example, measuring power supply voltages. An onboard microprocessor can then be used to enable calibration routines. Utilizing these internal functions saves production test time and resources. As the SoC's available computing power increases with advancing process nodes, BIST becomes a more valuable feature.

In order to enable BIST, circuits related to measurements are required to have strict accuracy. For instance, a current-monitor circuit for a low-dropout (LDO) voltage regulator, which is used to estimate a load current supplied by the LDO to underlying circuit blocks, is required to produce an accurate replicant load-current scaled down in size. Typically, many LDO voltage regulators are used throughout the SoC for block-to-block isolation. Due to this frequent instantiation, a small increase in area or quiescent-current of the current-monitor circuit will result in a large increase over the entire chip.

One conventional current-monitor circuit for the LDO voltage regulator typically uses a simple current-mirror structure. However, when the LDO voltage regulator is requested to operate at a small drain-source voltage (i.e., at a low LDO input voltage), the simple current-mirror structure cannot provide an accurate scaled result to the BIST, and also introduces saturation region inaccuracy. Furthermore, the simple current-mirror structure may also limit a maximum current range that can be measured in BIST. Another conventional solution to implement the current-monitor circuit is using a current conveyor structure, which may reduce/eliminate saturation region inaccuracy. However, the current conveyor structure must be well matched to maintain accuracy, leading to a bigger device and more chip area being used. In addition, the current conveyor structure also struggles at the lower LDO input voltage and introduces more inaccuracy in scaling.

Accordingly, there remains a need for improved current-monitor circuit designs that enable high-accuracy load-current measurements of the LDO voltage regulator in the BIST block of the SoC. Further, there is also a need to keep the final product high density, cost-effective, and easy to implement.

SUMMARY

The present disclosure describes a system-on-chip (SoC) including a current-monitor circuit that enables high-accuracy load-current measurements of a low-dropout (LDO) voltage regulator in a built-in self-test (BIST) block. The disclosed SoC includes the BIST block, the LDO voltage regulator with a pass metal-oxide semiconductor field-effect transistor (MOSFET), and a current-monitor circuit with a sensing MOSFET, a tuning MOSFET, a sensing resistor, and a tuning resistor. Herein, both the pass MOSFET and the sensing MOSFET receive an input voltage, and a gate of the pass MOSFET is coupled to a gate of the sensing MOSFET. The sensing MOSFET, the tuning MOSFET, and the sensing resistor are connected in series between the input voltage and ground, and the tuning resistor is coupled between a gate of the tuning MOSFET and ground. The BIST block is configured to tune a current through the tuning resistor so as to adjust a voltage at a connection point of the sensing MOSFET and the tuning MOSFET.

In one embodiment of the SoC, a first terminal of the pass MOSFET receives the input voltage, a second terminal of the pass MOSFET has an output voltage of the LDO voltage regulator, and the gate of the pass MOSFET is a third terminal of the pass MOSFET. A first terminal of the sensing MOSFET receives the input voltage, a second terminal of the sensing MOSFET is coupled to a first terminal of the tuning MOSFET, and the gate of the sensing MOSFET is a third terminal of the sensing MOSFET. A second terminal of the tuning MOSFET is coupled to ground via the sensing resistor, and the gate of the tuning MOSFET is a third terminal of the tuning MOSFET.

In one embodiment of the SoC, the LDO voltage regulator further includes an error amplifier, which is configured to receive the output voltage of the LDO voltage regulator and a reference voltage and configured to drive the gate of the pass MOSFET and the gate of the sensing MOSFET based on a comparison of the output voltage of the LDO voltage regulator and the reference voltage.

In one embodiment of the SoC, the BIST block is configured to tune the current through the tuning resistor so as to adjust the voltage at the connection point of the sensing MOSFET and the tuning MOSFET towards the output voltage of the LDO voltage regulator.

In one embodiment of the SoC, the BIST block is configured to sense the output voltage of the LDO voltage regulator, configured to sense the voltage at the connection point of the sensing MOSFET and the tuning MOSFET, configured to calculate a voltage difference between the output voltage of the LDO voltage regulator and the voltage at the connection point of the sensing MOSFET and the tuning MOSFET, and configured to tune the current through the tuning resistor based on the voltage difference between the output voltage of the LDO voltage regulator and the voltage at the connection point of the sensing MOSFET and the tuning MOSFET.

In one embodiment of the SoC, each of the pass MOSFET and the sensing MOSFET is a P-channel MOSFET (PMOS). The first terminal of the pass MOSFET is a source of the pass MOSFET, and the second terminal of the pass MOSFET is a drain of the pass MOSFET. The first terminal of the sensing MOSFET is a source of the sensing MOSFET, and the second terminal of the sensing MOSFET is a drain of the pass MOSFET.

In one embodiment of the SoC, the tuning MOSFET is a PMOS. the first terminal of the tuning MOSFET is a source of the tuning MOSFET, and the second terminal of the tuning MOSFET is a drain of the tuning MOSFET. The voltage at the connection point of the sensing MOSFET and the tuning MOSFET is $V_{GS}+(I_{TUNE}*R_{TUNE})$, wherein: $V_{GS}$ is a gate-source voltage of the tuning MOSFET, $I_{TUNE}$ is the current through the tuning resistor; and $R_{TUNE}$ is a resistance of the tuning resistor.

In one embodiment of the SoC, the LDO voltage regulator is configured to provide a load current from the second terminal of the pass MOSFET to ground. A width to length (W/L) ratio of the pass MOSFET is N times a W/L ratio of the sensing MOSFET, wherein N is a positive number. A maximum value of the sensing resistor is N times $(V_{OUT}-V_{DS\_SAT})/I_{LOAD\_MAX}$, wherein: $V_{OUT}$ is the output voltage of the LDO voltage regulator, $V_{DS\_SAT}$ is a saturation value of a drain-source voltage of the tuning MOSFET, and $I_{LOAD\_MAX}$ is a max value of the load current provided by the LDO voltage regulator.

In one embodiment of the SoC, the tuning MOSFET is a N-channel MOSFET (NMOS). The first terminal of the tuning MOSFET is a drain of the tuning MOSFET, and the second terminal of the tuning MOSFET is a source of the tuning MOSFET. The voltage at the connection point of the sensing MOSFET and the tuning MOSFET is $V_{GD}+(I_{TUNE}*R_{TUNE})$, wherein: $V_{GD}$ is a gate-drain voltage of the tuning MOSFET, $I_{TUNE}$ is the current through the tuning resistor, and $R_{TUNE}$ is a resistance of the tuning resistor.

In one embodiment of the SoC, each of the pass MOSFET and the sensing MOSFET is a NMOS. The first terminal of the pass MOSFET is a drain of the pass MOSFET, and the second terminal of the pass MOSFET is a source of the pass MOSFET. The first terminal of the sensing MOSFET is a drain of the sensing MOSFET, and the second terminal of the sensing MOSFET is a source of the pass MOSFET.

In one embodiment of the SoC, the tuning MOSFET is a PMOS. The first terminal of the tuning MOSFET is a source of the tuning MOSFET, and the second terminal of the tuning MOSFET is a drain of the tuning MOSFET. The voltage at the connection point of the sensing MOSFET and the tuning MOSFET is $V_{GS}+(I_{TUNE}*R_{TUNE})$, wherein: $V_{GS}$ is a gate-source voltage of the tuning MOSFET, $I_{TUNE}$ is the current through the tuning resistor, and $R_{TUNE}$ is a resistance of the tuning resistor.

In one embodiment of the SoC, the tuning MOSFET is a NMOS. The first terminal of the tuning MOSFET is a drain of the tuning MOSFET, and the second terminal of the tuning MOSFET is a source of the tuning MOSFET. The voltage at the connection point of the sensing MOSFET and the tuning MOSFET is $V_{GD}+(I_{TUNE}*R_{TUNE})$, wherein: $V_{GD}$ is a gate-drain voltage of the tuning MOSFET, $I_{TUNE}$ is the current through the tuning resistor, and $R_{TUNE}$ is a resistance of the tuning resistor.

In one embodiment of the SoC, a W/L ratio of the pass MOSFET is N times a W/L ratio of the sensing MOSFET, wherein N is a positive number.

In one embodiment of the SoC, the pass MOSFET and the sensing MOSFET have a same polarity channel. The tuning MOSFET is a PMOS or a NMOS.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2A-4B illustrate the SoC including the improved current-monitor circuit that is implemented with different transistor types according to some embodiments of the present disclosure.

Figures 1A, 1B:
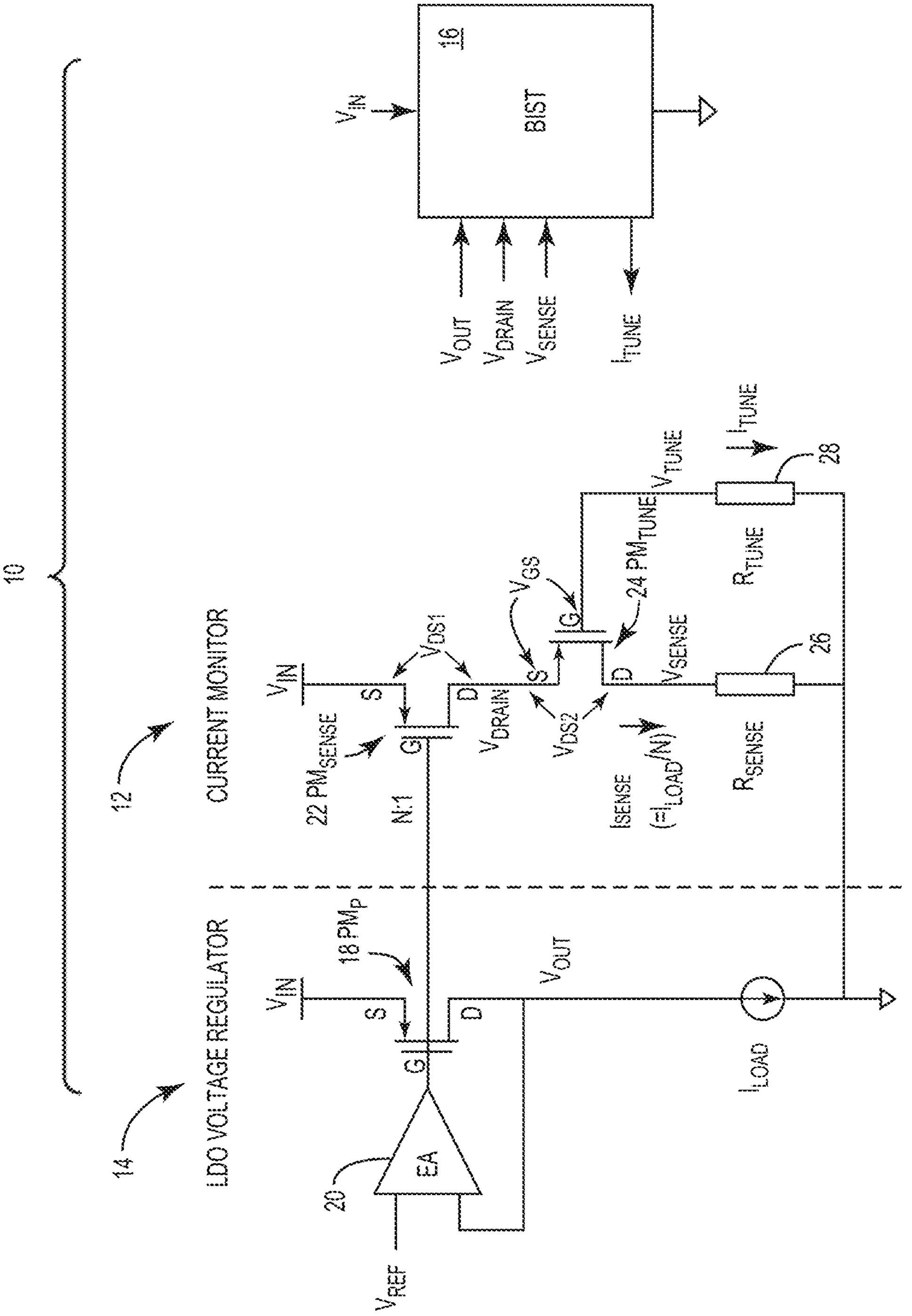
FIGS. 1A and 1B illustrate a system-on-chip (SoC) including an improved current-monitor circuit that enables high-accuracy load-current measurements of a low-dropout (LDO) voltage regulator in a built-in self-test (BIST) block according to some embodiments of the present disclosure.

It will be understood that for clear illustrations, FIGS. 1-5B may not be drawn to scale.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to a current-monitor circuit that enables high-accuracy load-current measurements of a low-dropout (LDO) voltage regulator in a built-in self-test (BIST) block of a system-on-chip (SoC). FIGS. 1A and 1B together illustrate an exemplary SoC 10 with an exemplary current-monitor circuit 12 according to some embodiments of the present disclosure. For the purpose of this simplified illustration, the SoC 10 includes the current-monitor circuit 12, a LDO voltage regulator 14 coupled with the current-monitor circuit 12 (FIG. 1A), and a BIST block 16 (FIG. 1B) configured to estimate/measure a load current of the LDO voltage regulator 14. In realistic applications, the SoC 10 may include multiple LDO voltage regulators, multiple current-monitor circuits, and other electronic functional blocks (not shown herein), and may refer to an entire microchip. Herein, the LDO voltage regulator 14 is configured to provide a load current $I_{LOAD}$ to underlying circuit blocks (not shown) based on an input voltage $V_{IN}$ and a reference voltage $V_{REF}$. Typically, the load current $I_{LOAD}$ is relatively large, which is not appropriate for a direct measurement in the BIST block 16 (e.g., waste of power). The current-monitor circuit 12 is coupled to the LDO voltage regulator 14 and is configured to provide a sensing voltage $V_{SENSE}$, which is scaled with the load current $I_{LOAD}$. The BIST block 16 is configured to measure the sensing voltage $V_{SENSE}$ and estimate the load current $I_{LOAD}$ of the LDO voltage regulator 14 based on the sensing voltage $V_{SENSE}$. Therefore, the scaling accuracy between the load current $I_{LOAD}$ of the LDO voltage regulator 14 and the sensing voltage $V_{SENSE}$ of the current-monitor circuit 12 determines whether the measurement/estimation of the BIST block 16 is valid/accurate.

In detail, the LDO voltage regulator 14 includes a pass device 18 and an error amplifier (EA) 20. In one embodiment, the pass device 18 may be implemented by a P-channel metal-oxide-semiconductor (PMOS) field-effect transistor (FET) $PM_P$, where a source of the $PM_P$ 18 is coupled to the input voltage $V_{IN}$ and a voltage at a drain of the $PM_P$ 18 is an output voltage $V_{OUT}$ of the LDO voltage regulator 14. The EA 20 may be implemented by an operational amplifier and functions as a feedback loop in the LDO voltage regulator 14. The EA 20 is configured to receive the output voltage $V_{OUT}$ and the reference voltage $V_{REF}$ and drives a gate of the $PM_P$ 18. The $PM_P$ 18 may remain saturated when the input voltage $V_{IN}$ is sufficiently large, and it is this saturation that can ensure the output voltage $V_{OUT}$ remains stable. Notice that the LDO voltage regulator 14 may further include extra electronic components (e.g., one or more resistors, one or more capacitors, and/or etc., not shown for simplicity) between the drain of the $PM_P$ 18 and ground, so as to provide the load current $I_{LOAD}$.

The current-monitor circuit 12 includes a sensing device 22, a tuning device 24, a sensing resistor $R_{SENSE}$ 26, and a tuning resistor $R_{TUNE}$ 28. In one embodiment, the sensing device 22 may be implemented by a PMOS FET $PM_{SENSE}$, and the tuning device 24 may be implemented by a PMOS FET $PM_{TUNE}$. Herein, a source of the $PM_{SENSE}$ 22 is coupled to the input voltage $V_{IN}$, a drain of the $PM_{SENSE}$ 22 with a drain voltage $V_{DRAIN}$ is coupled to a source of the $PM_{TUNE}$ 24, and a gate of the $PM_{SENSE}$ 22 is driven by the EA 20 of the LDO voltage regulator 14. A drain of the $PM_{TUNE}$ 24 with a sensing voltage $V_{SENSE}$ is coupled to ground via the sensing resistor $R_{SENSE}$ 26, and a gate of the $PM_{TUNE}$ 24 with a tuning voltage $V_{TUNE}$ is coupled to ground via the tuning resistor $R_{TUNE}$ 28. The $PM_{TUNE}$ 24 is connected in a source-follower configuration.

Typically, a width to length (W/L) ratio of the $PM_P$ 18 is N times a W/L ratio of the $PM_{SENSE}$ 22, where N is a positive number. If the drain voltage $V_{DRAIN}$ at the drain of the $PM_{SENSE}$ 22 can be tuned equal to the output voltage $V_{OUT}$ at the drain of the $PM_P$ 18, the load current $I_{LOAD}$ of the LDO voltage regulator 14 will be N times a sensing current ISENSE through the sensing resistor $R_{SENSE}$ 26 in the current-monitor circuit 12.

Herein, the drain voltage $V_{DRAIN}$ at the drain of the $PM_{SENSE}$ 22 is a sum of the tuning voltage $V_{TUNE}$ at the gate of the $PM_{TUNE}$ 24 plus a gate-source voltage $V_{GS}$ of the $PM_{TUNE}$ 24, and the tuning voltage $V_{TUNE}$ at the gate of the $PM_{TUNE}$ 24 is equal to a tuning current $I_{TUNE}$ multiplied by a resistance of the tuning resistor $R_{TUNE}$ 28.

$$V_{DRAIN} = V_{GS} + V_{TUNE}$$

$$V_{TUNE} = I_{TUNE} \cdot R_{TUNE}$$

As such, adjusting the tuning current $I_{TUNE}$ through the tuning resistor $R_{TUNE}$ 28 can change the value of the drain voltage $V_{DRAIN}$ at the drain of the $PM_{SENSE}$ 22, so as to match the drain voltage $V_{DRAIN}$ at the drain of the $PM_{SENSE}$ 22 to the output voltage $V_{OUT}$ at the drain of the $PM_P$ 18.

The BIST block 16 is configured to sense the output voltage $V_{OUT}$ (at the drain of the $PM_P$ 18) and the drain voltage $V_{DRAIN}$ (at the drain of the $PM_{SENSE}$ 22). Next, the BIST block 16 is configured to calculate a voltage difference between the output voltage $V_{OUT}$ (at the drain of the $PM_P$ 18) and the drain voltage $V_{DRAIN}$ (at the drain of the $PM_{SENSE}$ 22). And then, based on the voltage difference between the output voltage $V_{OUT}$ and the drain voltage $V_{DRAIN}$, the BIST block 16 is configured to provide/adjust the tuning current $I_{TUNE}$ (through the tuning resistor $R_{TUNE}$ 28) to tune the drain voltage $V_{DRAIN}$ (at the drain of the $PM_{SENSE}$ 22) towards the output voltage $V_{OUT}$ at the drain of the $PM_P$ 18. The tuning current $I_{TUNE}$ is achieved by using the BIST current force functionality. Therefore, the BIST block 16 is not considered in an area overhead as no new functionality is needed in the BIST block 16.

The BIST block 16 may repeat the aforementioned steps until equalized. Once the drain voltage $V_{DRAIN}$ (at the drain of the $PM_{SENSE}$ 22) is equal to the output voltage $V_{OUT}$ (at the drain of the $PM_P$ 18) by BIST tuning, the sensing current ISENSE through the sensing resistor $R_{SENSE}$ 26, which can be calculated by $V_{SENSE}/R_{SENSE}$, should be 1/N of the load current $I_{LOAD}$ of the LDO voltage regulator 14. Accordingly, the BIST 16 is enabled to estimate the load current $I_{LOAD}$ of the LDO voltage regulator 14 by measuring the sensing voltage $V_{SENSE}$ at the drain of the $PM_{TUNE}$ 24.

$$I_{LOAD} = N^*(V_{SENSE}/R_{SENSE})$$

Notice that the target value of the drain voltage $V_{DRAIN}$ (at the drain of the $PM_{SENSE}$ 22) should be equal to the output voltage $V_{OUT}$ (at the drain of the $PM_P$ 18), which eliminates inaccuracies associated with mismatched MOSFET operating regions (e.g., non-saturation regions). As such, even when the LDO voltage regulator 14 is requested to operate at a small drain-source voltage (i.e., at a low LDO input voltage $V_{IN}$), the current-monitor circuit 12 can still provide an accurate scaled result (i.e., $V_{SENSE}$) to the BIST 16. And consequently, the load current estimated by the BIST 16 should accurately match the actual load current $I_{LOAD}$.

The SoC 10 with the improved current-monitor circuit 12 may have other advantages over a conventional SoC with a simple current-mirror structure or a current conveyor structure. Since the current-monitor circuit 12 has only one mirror stage, no significant systematic error is introduced due to multiple mirror stages. The SoC 10 results in minimal usage of the chip area, as the $PM_{TUNE}$ 24 and the tuning resistor $R_{TUNE}$ 28 have no matching requirements. Therefore, the $PM_{TUNE}$ 24 and the tuning resistor $R_{TUNE}$ 28 can be small. A quiescent current and leakage current of the current-monitor circuit 12 do not increase as no extra mirror stages are added to the output of the LDO voltage regulator 14 or the input voltage $V_{IN}$. In SoC 10, some inaccuracy may be introduced due to the quantization error of the BIST block 16. However, due the high accuracy demands already upon the BIST block 16, the quantization error is very low.

Furthermore, the connection configuration of the current-monitor circuit 12 is more suitable for maximizing the current measurement range than the current conveyor structure. It is clear that the sensing voltage $V_{SENSE}$ (at the drain of the $PM_{TUNE}$ 24) is equal to a difference between the drain voltage $V_{DRAIN}$ (at the drain of the $PM_{SENSE}$ 22) and a drain-source voltage $V_{DS2}$ of the $PM_{TUNE}$ 24. When the drain voltage $V_{DRAIN}$ at the drain of the $PM_{SENSE}$ 22 is equal to the output voltage $V_{OUT}$ at the drain of the $PM_P$ 18 (by BIST tuning), the sensing voltage $V_{SENSE}$ at the drain of the $PM_{TUNE}$ 24 is equal to a difference between the output voltage $V_{OUT}$ (at the drain of the $PM_P$ 18) and the drain-source voltage $V_{DS2}$ of the $PM_{TUNE}$ 24.

$$\text{If } V_{DRAIN} = V_{OUT}$$

$$V_{SENSE} = V_{OUT} - V_{DS2}$$

When the $PM_{TUNE}$ 24 works in a saturation condition, the sensing voltage $V_{SENSE}$ may reach a maximum value, which is equal to a difference between the output voltage $V_{OUT}$ (at the drain of the $PM_P$ 18) and a saturation drain-source voltage $V_{DS2\_SAT}$ of the $PM_{TUNE}$ 24 (for a given $V_{IN}$).

$$V_{SENSE\_MAX} = V_{OUT} - V_{DS2\_SAT}$$

In order to estimate a maximum value of the load current $I_{LOAD}$ of the LDO voltage regulator 14 (i.e., achieving a maximum value of the sensing current ISENSE through the sensing resistor $R_{SENSE}$ 26), a maximum value of the sensing resistor $R_{SENSE}$ 26 can reach:

$$R_{SENSE\_MAX} = V_{SENSE\_MAX}/I_{SENSE\_MAX}$$

$$R_{SENSE\_MAX} = (V_{OUT} - V_{DS2\_SAT})/I_{SENSE\_MAX}$$

$$R_{SENSE\_MAX} = N^*(V_{OUT} - V_{DS2\_SAT})/I_{LOAD\_MAX}$$

If a current conveyor structure is used in the current-monitor circuit 12, two or more $V_{DS2\_SAT}$ will be deducted in the mirror stage. With the same value of the sensing resistor $R_{SENSE}$, the estimable maximum value of the load current $I_{LOAD}$ of the LDO voltage regulator 14 will decrease.

The BIST block 16 is also configured to receive the input voltage $V_{IN}$ and is coupled to ground. The input voltage $V_{IN}$ is equal to a sum of a drain-source voltage $V_{DS1}$ of the $PM_{SENSE}$ 22, the drain-source voltage $V_{DS2}$ of the $PM_{TUNE}$ 24, and the sensing voltage $V_{SENSE}$ at the drain of the $PM_{TUNE}$ 24.

$$V_{IN} = V_{DS1} + V_{DS2} + V_{SENSE}$$

Therefore, the guaranteed maximum value of the sensing voltage $V_{SENSE}$ is $$V_{SENSE\_MAX} = V_{IN} - V_{DS1\_SAT} - V_{DS2\_SAT}$$

where $V_{DS1\_SAT}$ is a saturation drain-source voltage of the $PM_{SENSE}$ 22.

Figures 2A, 2B:
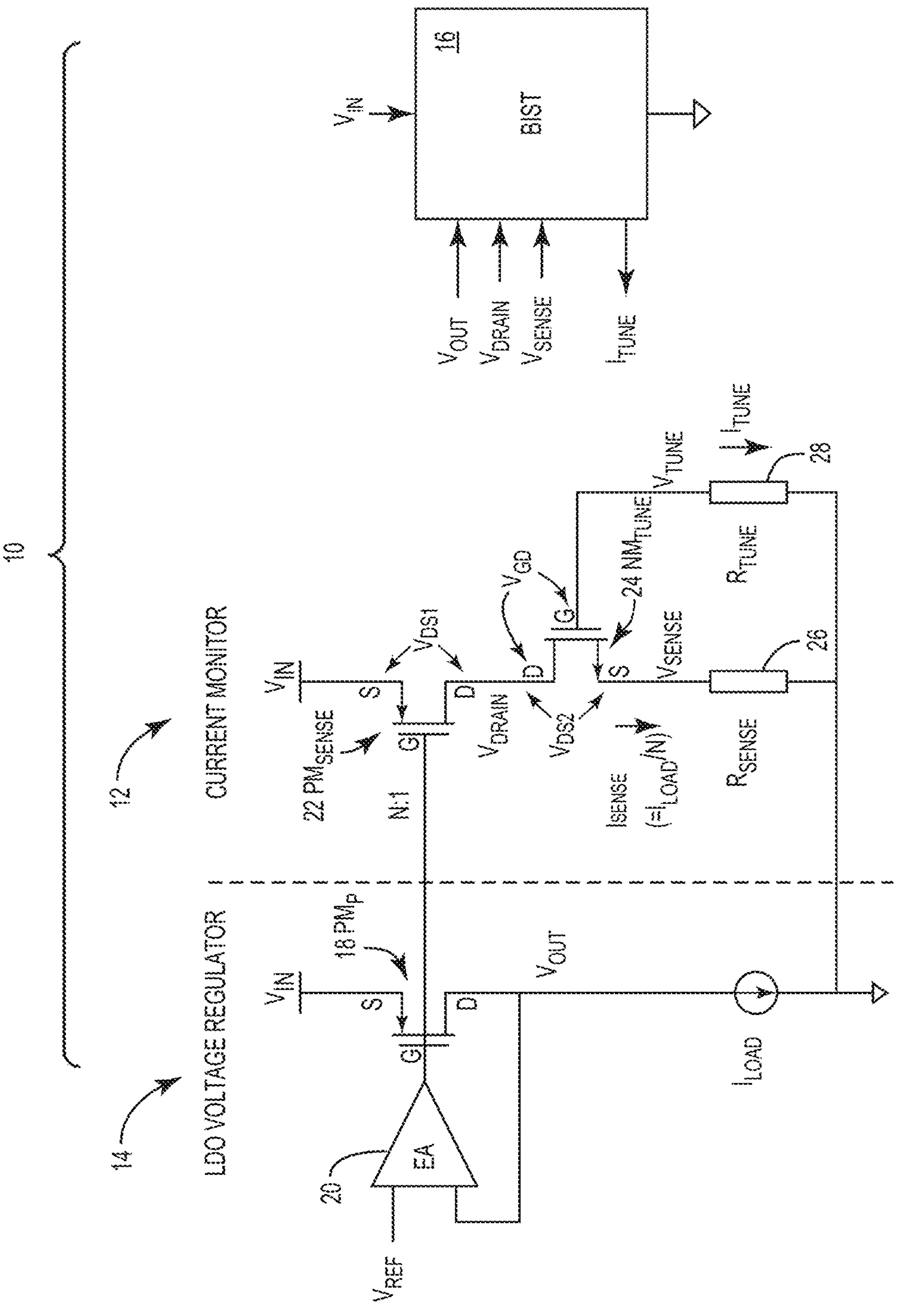

In one embodiment, when the pass device 18 of the LDO voltage regulator 14 is implemented by the PMOS FET $PM_P$, the tuning device 24 of the current-monitor circuit 12 may be implemented by a N-channel metal-oxide-semiconductor (NMOS) FET $NM_{TUNE}$ instead of the $PM_{TUNE}$, while the sensing device 22 of the current-monitor circuit 12 retains the PMOS FET $PM_{SENSE}$ implementation, as illustrated in FIGS. 2A and 2B.

In this embodiment, the drain voltage $V_{DRAIN}$ at the drain of the $PM_{SENSE}$ 22 is a sum of the tuning voltage $V_{TUNE}$ at the gate of the $NM_{TUNE}$ 24 plus a gate-drain voltage $V_{GD}$ of the $NM_{TUNE}$ 24, and the tuning voltage $V_{TUNE}$ at the gate of the $NM_{TUNE}$ 24 is equal to the tuning current $I_{TUNE}$ multiplied by the resistance of the tuning resistor $R_{TUNE}$ 28.

$$V_{DRAIN} = V_{GD} + V_{TUNE}$$

$$V_{TUNE} = I_{TUNE} \cdot R_{TUNE}$$

Herein, adjusting the tuning current $I_{TUNE}$ through the tuning resistor $R_{TUNE}$ 28 can still control the value of the drain voltage $V_{DRAIN}$ at the drain of the $PM_{SENSE}$ 22 towards the output voltage $V_{OUT}$ at the drain of the $PM_P$ 18 (although in a non-linear way). The measure process of the BIST block 16 is still: 1) sensing the output voltage $V_{OUT}$ (at the drain of the $PM_P$ 18) and the drain voltage $V_{DRAIN}$ (at the drain of the $PM_{SENSE}$ 22); 2) calculating the voltage difference between the output voltage $V_{OUT}$ and the drain voltage $V_{DRAIN}$; 3) adjusting the tuning current $I_{TUNE}$ to tune the drain voltage $V_{DRAIN}$ towards the output voltage $V_{OUT}$ based on the voltage difference between the output voltage $V_{OUT}$ and the drain voltage $V_{DRAIN}$; 4) repeating steps 1)-3) until equalized; 5) measuring the sensing voltage $V_{SENSE}$ at a source of the $NM_{TUNE}$ 24; and 6) calculating/estimating the load current $I_{LOAD}$ of the LDO voltage regulator 14 by $I_{LOAD}$=N*($V_{SENSE}$/$R_{SENSE}$).

In addition, when the tuning device 24 is implemented by $NM_{TUNE}$, to enable the operation of the $NM_{TUNE}$ 24, the sensing voltage $V_{SENSE}$ at the source of the $NM_{TUNE}$ 24 must be smaller than the tuning voltage $V_{TUNE}$ at the gate of the $NM_{TUNE}$ 24.

$$V_{SENSE} = V_{TUNE} - V_{GS}$$

$$V_{SENSE} = V_{DRAIN} - V_{GD} - V_{GS}$$

Herein, $V_{GS}$ is a gate-source voltage of the $NM_{TUNE}$ 24. When the drain voltage $V_{DRAIN}$ at the drain of the $PM_{SENSE}$ 22 is equal to the output voltage $V_{OUT}$ at the drain of the $PM_P$ 18 (by BIST tuning), the sensing voltage $V_{SENSE}$ at the source of the $NM_{TUNE}$ 24 is:

$$V_{SENSE} = V_{OUT} - V_{GD} - V_{GS}$$

With the $NM_{TUNE}$ 24, the sensing voltage $V_{SENSE}$ is limited to supporting the $V_{GS}$ of the $NM_{TUNE}$ 24, while with the $PM_{TUNE}$ 24, the sensing voltage $V_{SENSE}$ is only limited to supporting the $V_{DS}$ of the $PM_{TUNE}$ 24.

In one embodiment, the pass device 18 of the LDO voltage regulator 14 may be implemented by a NMOS FET $NM_P$ instead of the $PM_P$, and in order to achieve an accurate scaling, the sensing device 22 of the current-monitor circuit 12 may be implemented by a NMOS FET $NM_{SENSE}$ instead of the $PM_{SENSE}$, as illustrated in FIGS. 3A & 3B and FIGS. 4A &4B. Herein, the tuning device 24 may be implemented by the $PM_{TUNE}$ (shown in FIG. 3A) or by the $NM_{TUNE}$ (shown in FIG. 4A).

Figures 3A, 3B:
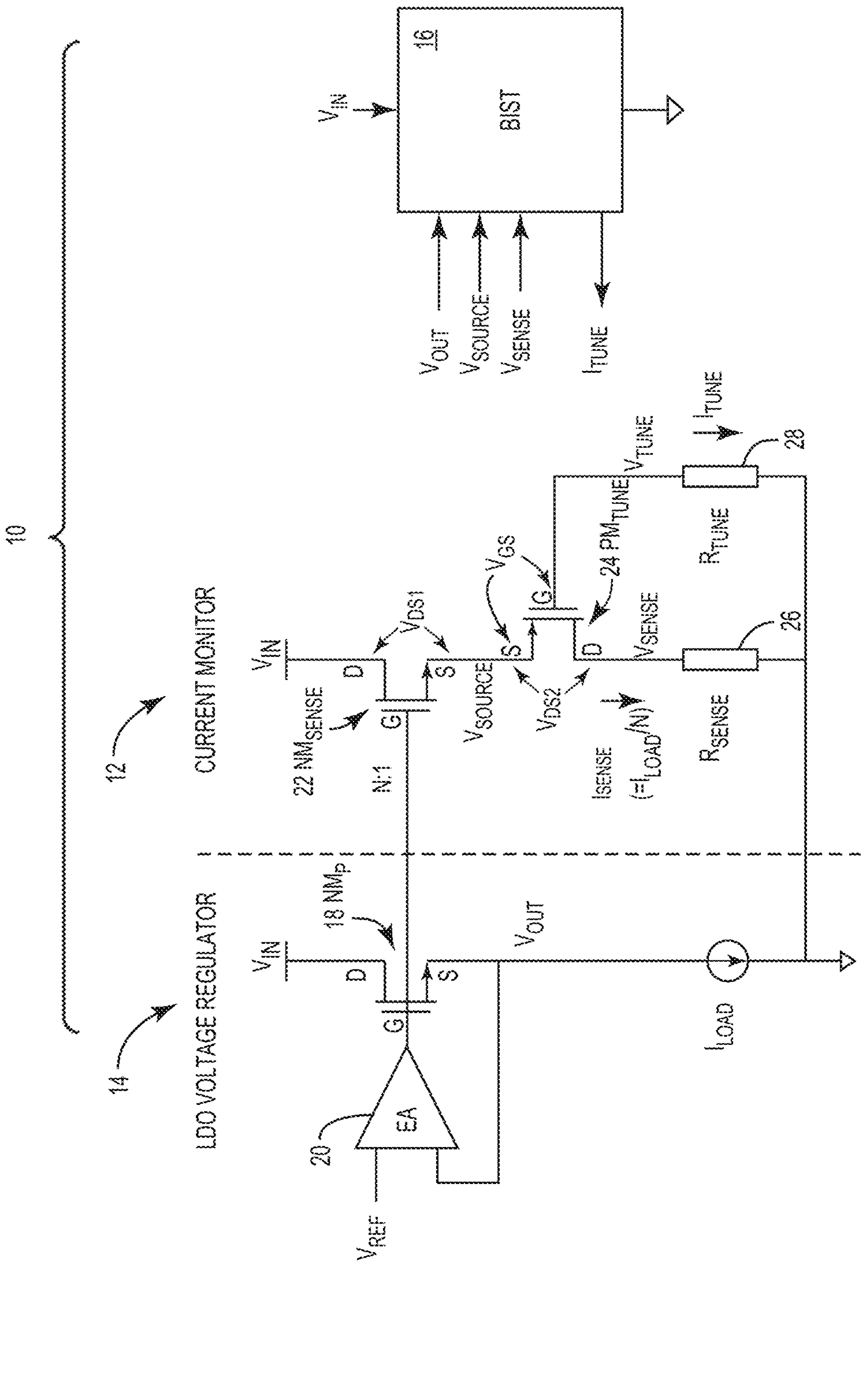

In FIG. 3A, the EA 20 of the LDO voltage regulator 14 drives both a gate of the $NM_P$ 18 of the LDO voltage regulator 14 and a gate of the $NM_{SENSE}$ 22. A drain of the $NM_P$ 18 and a drain of the $NM_{SENSE}$ 22 are both coupled to the input voltage $V_{IN}$. A W/L ratio of the $NM_P$ 18 is N times a W/L ratio of the $NM_{SENSE}$ 22, where N is a positive number. If a source voltage $V_{SOURCE}$ at a source of the $NM_{SENSE}$ 22 can be tuned equal to the output voltage $V_{OUT}$ at a source of the $NM_P$ 18, the load current $I_{LOAD}$ of the LDO voltage regulator 14 will be N times the sensing current ISENSE through the sensing resistor $R_{SENSE}$ 26 in the current-monitor circuit 12. Herein, the source voltage $V_{SOURCE}$ at the source of the $NM_{SENSE}$ 22 is a sum of the tuning voltage $V_{TUNE}$ at the gate of the $PM_{TUNE}$ 24 plus a gate-source voltage $V_{GS}$ of the $PM_{TUNE}$ 24, and the tuning voltage $V_{TUNE}$ at the gate of the $PM_{TUNE}$ 24 is equal to the tuning current $I_{TUNE}$ multiplied by the resistance of the tuning resistor $R_{TUNE}$ 28.

$$V_{SOURCE} = V_{GS} + V_{TUNE}$$

$$V_{TUNE} = I_{TUNE} \cdot R_{TUNE}$$

As such, adjusting the tuning current $I_{TUNE}$ through the tuning resistor $R_{TUNE}$ 28 can control the value of the source voltage $V_{SOURCE}$ at the source of the $NM_{SENSE}$ 22 towards the output voltage $V_{OUT}$ at the source of the $NM_P$ 18. The measure process of the BIST block 16 (shown in FIG. 3B) is: 1) sensing the output voltage $V_{OUT}$ (at the source of the $NM_P$ 18) and the source voltage $V_{SOURCE}$ (at the source of the $NM_{SENSE}$ 22); 2) calculating the voltage difference between the output voltage $V_{OUT}$ and the source voltage $V_{SOURCE}$; 3) adjusting the tuning current $I_{TUNE}$ to tune the source voltage $V_{SOURCE}$ towards the output voltage $V_{OUT}$ based on the voltage difference between the output voltage $V_{OUT}$ and the source voltage $V_{SOURCE}$; 4) repeating steps 1)-3) until equalized; 5) measuring the sensing voltage $V_{SENSE}$ at the drain of the $PM_{TUNE}$ 24; and 6) calculating/estimating the load current $I_{LOAD}$ of the LDO voltage regulator 14 by $I_{LOAD}$=N*($V_{SENSE}$/$R_{SENSE}$).

Figures 4A, 4B:
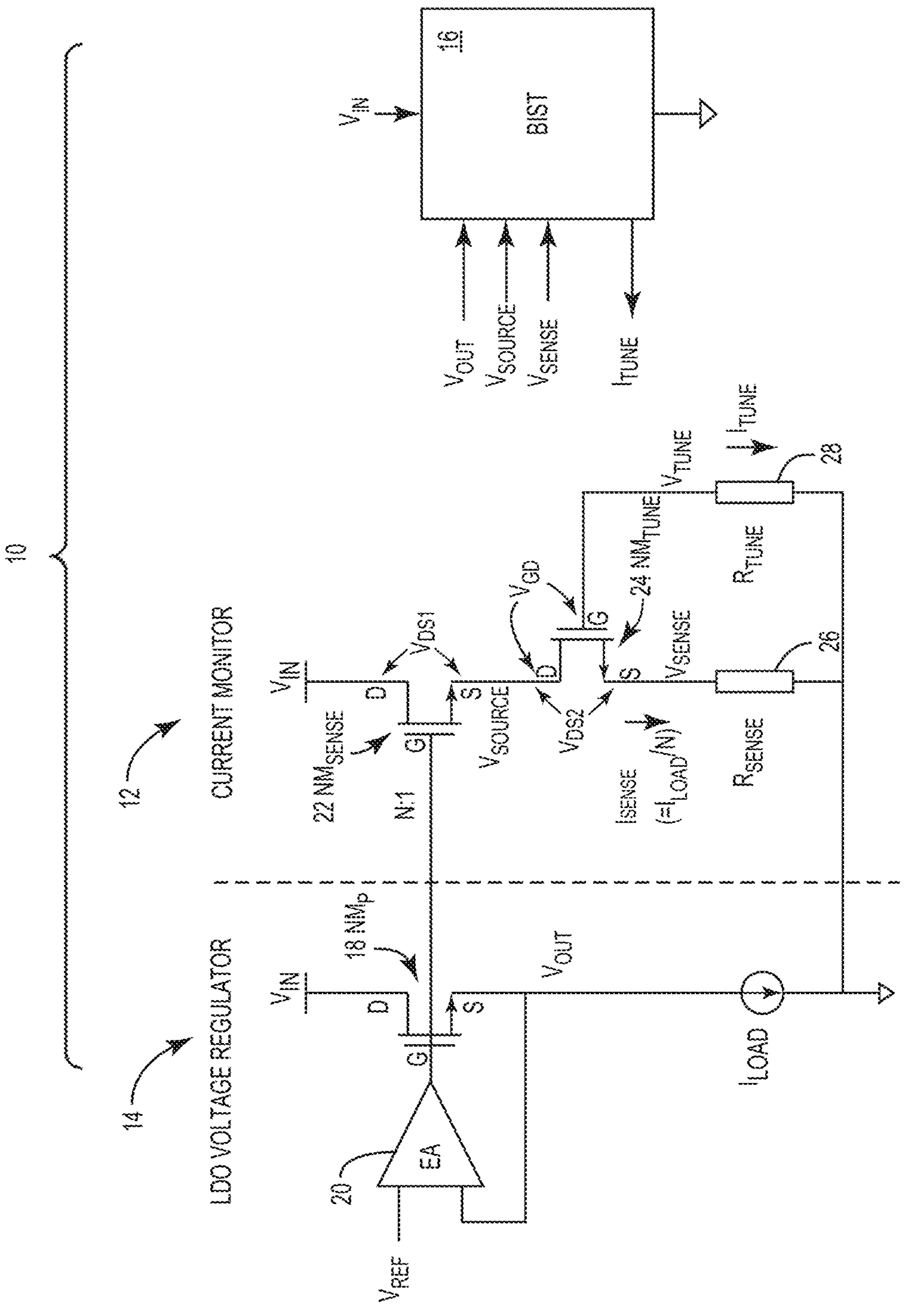

In FIG. 4A, both the pass device 18 and the sensing device 22 are implemented by NMOS FETs ($NM_P$ and $NM_{SENSE}$, respectively), while the tuning device 24 is implemented by the $NM_{TUNE}$. Similarly, the EA 20 of the LDO voltage regulator 14 drives both the gate of the $NM_P$ 18 of the LDO voltage regulator 14 and the gate of the $NM_{SENSE}$ 22. The drain of the $NM_P$ 18 and the drain of the $NM_{SENSE}$ 22 are both coupled to the input voltage $V_{IN}$. The W/L ratio of the $NM_P$ 18 is N times the W/L ratio of the $NM_{SENSE}$ 22. Herein, the source voltage $V_{SOURCE}$ at the source of the $NM_{SENSE}$ 22 is a sum of the tuning voltage $V_{TUNE}$ at the gate of the $NM_{TUNE}$ 24 plus a gate-drain voltage $V_{GD}$ of the $NM_{TUNE}$ 24, and the tuning voltage $V_{TUNE}$ at the gate of the $NM_{TUNE}$ 24 is equal to the tuning current $I_{TUNE}$ multiplied by the resistance of the tuning resistor $R_{TUNE}$ 28.

$$V_{SOURCE} = V_{GD} + V_{TUNE}$$

$$V_{TUNE} = I_{TUNE} \cdot R_{TUNE}$$

As such, adjusting the tuning current $I_{TUNE}$ through the tuning resistor $R_{TUNE}$ 28 can control the value of the source voltage $V_{SOURCE}$ at the source of the $NM_{SENSE}$ 22 towards the output voltage $V_{OUT}$ at the source of the $NM_P$ 18 (although in a non-linear way). The measure process of the BIST block 16 (shown in FIG. 4B) is: 1) sensing the output voltage $V_{OUT}$ (at the source of the $NM_P$ 18) and the source voltage $V_{SOURCE}$ (at the source of the $NM_{SENSE}$ 22); 2) calculating the voltage difference between the output voltage $V_{OUT}$ and the source voltage $V_{SOURCE}$; 3) adjusting the tuning current $I_{TUNE}$ to tune the source voltage $V_{SOURCE}$ towards the output voltage $V_{OUT}$ based on the voltage difference between the output voltage $V_{OUT}$ and the source voltage $V_{SOURCE}$; 4) repeating steps 1)-3) until equalized; 5) measuring the sensing voltage $V_{SENSE}$ at the source of the $NM_{TUNE}$ 24; and 6) calculating/estimating the load current $I_{LOAD}$ of the LDO voltage regulator 14 by $I_{LOAD}$=N*($V_{SENSE}$/$R_{SENSE}$).

Notice that the pass device 18 in the LDO voltage regulator 14 and the sensing device 22 in the current-monitor circuit 12 are typically implemented by a same type of transistor (e.g., both PMOS FETs or both NMOS FETs). However, the tuning device 24 in the current-monitor circuit 12 may be implemented by a same type or a different type of transistor compared to the pass device 18 in the LDO voltage regulator 14 (e.g., both PMOS FETs, both NMOS FETs, one PMOS FET for the pass device 18 and one NMOS FET for the tuning device 24, or one NMOS FET for the pass device 18 and one PMOS FET for the tuning device 24). A voltage at a connection point of the sensing device 22 and the tuning device 24 (e.g., $V_{DRAIN}$ in FIGS. 1A and 2A or $V_{SOURCE}$ in FIGS. 3A and 4A) is always tuned towards the output voltage $V_{OUT}$ of the LDO voltage regulator 14.

Figure 5A:
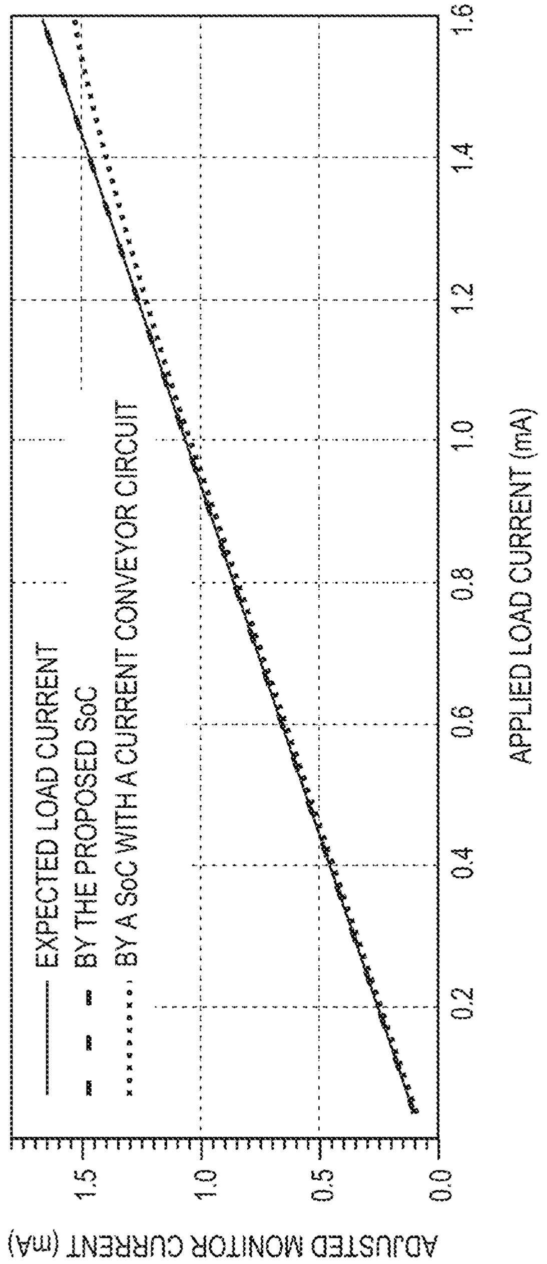
FIGS. 5A and 5B illustrate accuracy performance of the SoC including the improved current-monitor circuit shown in FIGS. 1A and 1B.
Figure 5B:
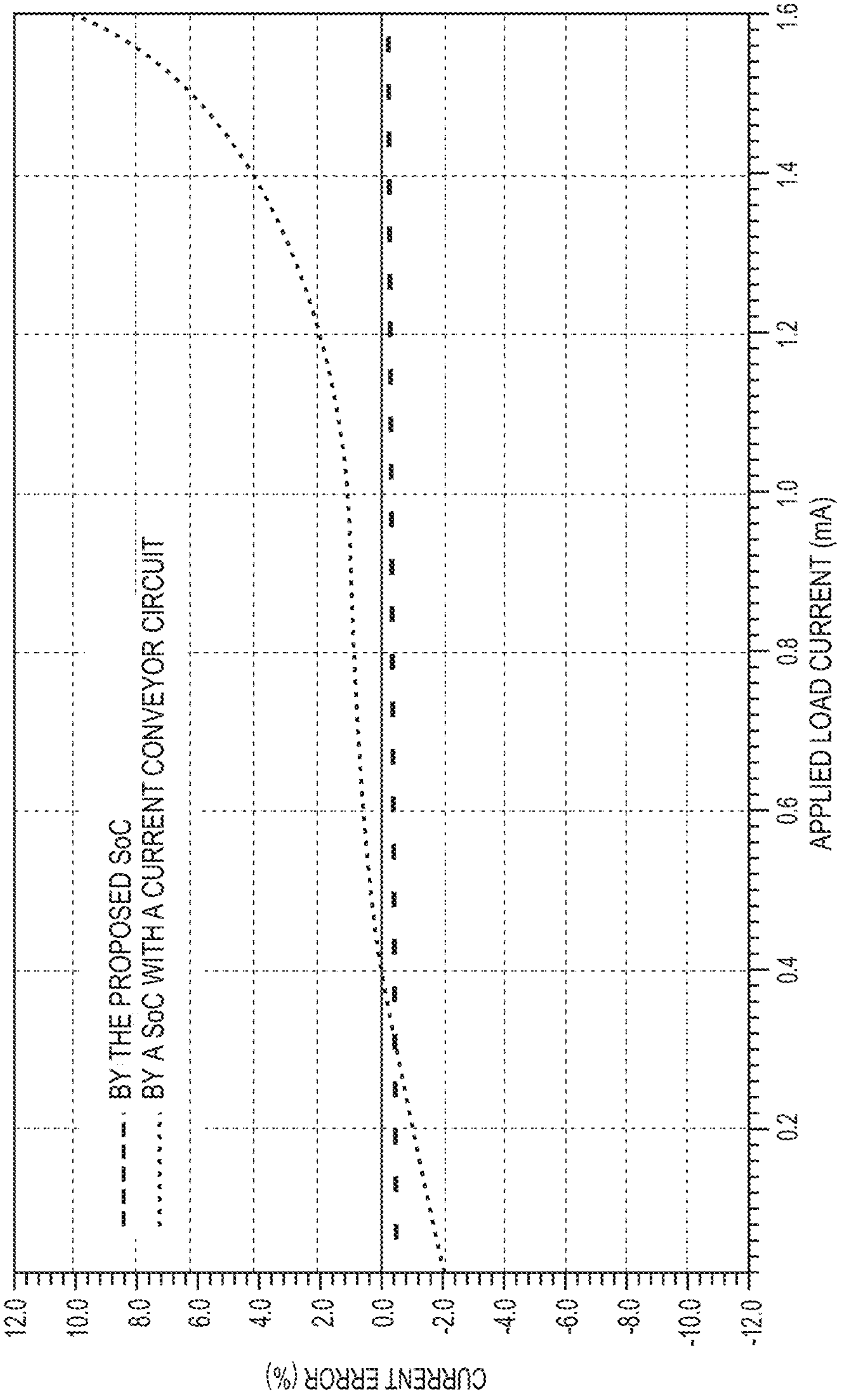

FIGS. 5A and 5B compare accuracy performance of the SoC 10 including the improved current-monitor circuit 12 shown in FIGS. 1A &1B to a conventional SoC with a current-conveyor circuit (not shown), in an equalized situation. The performance data is captured using the same LDO voltage regulator 14 and the same typical operating conditions. FIG. 5A shows the actual applied load current vs. the adjusted mirrored current (adjusted by N scaling value, i.e., the estimated load current). It can be observed that in the conventional SoC, the adjusted mirrored current deviates from the expected current, while in the proposed SoC 10, the adjusted mirrored current matches the expected current. FIG. 5B shows a percentage error of the actual applied load current vs. the adjusted mirrored current. It can be observed that proposed SoC 10 is performing at an order of magnitude less error compared with the conventional SoC with the current-conveyor circuit.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of operations of a built-in self-test (BIST) block for measuring a high-accuracy load-current of a voltage regulator that is coupled with a current-monitor circuit comprising:

sensing an output voltage of the voltage regulator, wherein:

the output voltage of the voltage regulator is a voltage at a first terminal of a pass metal-oxide-semiconductor field-effect transistor (MOSFET) included in the voltage regulator; and the load-current of the voltage regulator is a current flowing out of the first terminal of the pass MOSFET;

sensing a terminal voltage of a sensing MOSFET included in the current-monitor circuit, wherein:

the terminal voltage of the sensing MOSFET is a voltage at a first terminal of the sensing MOSFET; and a gate of the pass MOSFET and a gate of the sensing MOSFET are coupled together, and a second terminal of the pass MOSFET and a second terminal of the sensing MOSFET receive a same input voltage;

calculating a voltage difference between the output voltage and the terminal voltage;

providing a tuning current to the current-monitor circuit based on the voltage difference to adjust the terminal voltage towards the output voltage; and estimating the load-current of the voltage regulator by determining a sensing current from the first terminal of the sensing MOSFET in the current-monitor circuit once the output voltage and the terminal voltage are equal, wherein the tuning current is distinct from the sensing current and is not from the first terminal of the sensing MOSFET.

2. The method of claim 1, wherein steps of sensing the output voltage of the voltage regulator, sensing the terminal voltage of a sensing MOSFET, calculating a voltage difference between the output voltage and the terminal voltage, and providing the tuning current to the current-monitor circuit are performed repeatedly until the output voltage and the terminal voltage are equal.

3. The method of claim 1, wherein the load-current of the voltage regulator is estimated by multiplying the sensing current by N times, wherein:

the pass MOSFET has a first width to length (W/L) ratio, the sensing MOSFET has a second W/L ratio, and the first W/L ratio is N times the second W/L ratio; and N is a positive integer number.

4. The method of claim 1, wherein the voltage regulator is a low-dropout (LDO) voltage regulator, and includes the pass MOSFET and an error amplifier, which is configured to receive the output voltage of the LDO voltage regulator and a reference voltage and configured to drive the gate of the pass MOSFET and the gate of the sensing MOSFET based on a comparison of the output voltage of the LDO voltage regulator and the reference voltage.

5. The method of claim 1, wherein the current-monitor circuit includes the sensing MOSFET, a tuning MOSFET, a sensing resistor, and a tuning resistor, wherein:

the sensing MOSFET, the tuning MOSFET, and the sensing resistor are connected in series between the input voltage and ground, wherein a first terminal of the tuning MOSFET is coupled to ground via the sensing resistor, and a second terminal of the tuning MOSFET is directly connected to the first terminal of the sensing MOSFET;

the tuning resistor is coupled between a gate of the tuning MOSFET and ground; and providing the tuning current to the current-monitor circuit comprises providing the tuning current to the tuning resistor, so as to adjust the terminal voltage towards the output voltage.

6. The method of claim 5 wherein the tuning current provided by the BIST block to the current-monitor circuit is a current that flows through the tuning resistor so as to adjust the terminal voltage at the first terminal of the sensing MOSFET directly connected to the tuning MOSFET.

7. The method of claim 5 wherein determining the sensing current comprises:

measuring a sensing voltage at the first terminal of the tuning MOSFET; and calculating the sensing current by dividing the sensing voltage by a resistance of the sensing resistor.

8. The method of claim 7 wherein:

each of the pass MOSFET and the sensing MOSFET is a P-channel MOSFET (PMOS);

the first terminal of the pass MOSFET is a drain of the pass MOSFET, and the second terminal of the pass MOSFET is a source of the pass MOSFET; and the first terminal of the sensing MOSFET is a drain of the sensing MOSFET, and the second terminal of the sensing MOSFET is a source of the sensing MOSFET.

9. The method of claim 8 wherein:

the tuning MOSFET is a PMOS;

the first terminal of the tuning MOSFET is a drain of the tuning MOSFET, and the second terminal of the tuning MOSFET is a source of the tuning MOSFET; and the sensed terminal voltage equals $(I_{TUNE}*R_{TUNE})+V_{GS}$, and the measured sensing voltage equals $(I_{TUNE}*R_{TUNE})-V_{GD}$, wherein:

$V_{GS}$ is a gate-source voltage of the tuning MOSFET;

$V_{GD}$ is a gate-drain voltage of the tuning MOSFET;

$I_{TUNE}$ is the tuning current through the tuning resistor; and $R_{TUNE}$ is a resistance of the tuning resistor.

10. The method of claim 8 wherein:

the tuning MOSFET is a N-channel MOSFET (NMOS);

the first terminal of the tuning MOSFET is a source of the tuning MOSFET, and the second terminal of the tuning MOSFET is a drain of the tuning MOSFET; and the sensed terminal voltage equals $(I_{TUNE}*R_{TUNE})+V_{GD}$, and the measured sensing voltage equals $(I_{TUNE}*R_{TUNE})-V_{GS}$, wherein:

$V_{GD}$ is a gate-drain voltage of the tuning MOSFET;

$V_{GS}$ is a gate-source voltage of the tuning MOSFET;

$I_{TUNE}$ is the tuning current through the tuning resistor; and $R_{TUNE}$ is a resistance of the tuning resistor.

11. The method of claim 7 wherein:

each of the pass MOSFET and the sensing MOSFET is a N-channel MOSFET (NMOS);

the first terminal of the pass MOSFET is a source of the pass MOSFET, and the second terminal of the pass MOSFET is a drain of the pass MOSFET; and the first terminal of the sensing MOSFET is a source of the sensing MOSFET, and the second terminal of the sensing MOSFET is a drain of the pass MOSFET.

12. The method of claim 11 wherein:

the tuning MOSFET is a PMOS;

the first terminal of the tuning MOSFET is a drain of the tuning MOSFET, and the second terminal of the tuning MOSFET is a source of the tuning MOSFET; and the sensed terminal voltage equals $(I_{TUNE}*R_{TUNE})+V_{GS}$, and the measured sensing voltage equals $(I_{TUNE}*R_{TUNE})-V_{GD}$, wherein:

$V_{GS}$ is a gate-source voltage of the tuning MOSFET;

$V_{GD}$ is a gate-drain voltage of the tuning MOSFET;

$I_{TUNE}$ is the tuning current through the tuning resistor; and $R_{TUNE}$ is a resistance of the tuning resistor.

13. The method of claim 11 wherein:

the tuning MOSFET is a NMOS;

the first terminal of the tuning MOSFET is a source of the tuning MOSFET, and the second terminal of the tuning MOSFET is a drain of the tuning MOSFET; and the sensed terminal voltage equals $(I_{TUNE}*R_{TUNE})+V_{GD}$, and the measured sensing voltage equals $(I_{TUNE}*R_{TUNE})-V_{GS}$ wherein:

$V_{GD}$ is a gate-drain voltage of the tuning MOSFET;

$V_{GS}$ is a gate-source voltage of the tuning MOSFET;

$I_{TUNE}$ is the tuning current through the tuning resistor; and $R_{TUNE}$ is a resistance of the tuning resistor.

14. The method of claim 1 wherein:

the pass MOSFET and the sensing MOSFET have a same polarity channel; and the tuning MOSFET is a PMOS or a NMOS.

15. The method of claim 1 further comprising receiving the input voltage and being coupled to ground.

* * * * *